United States Patent [19]

Vilaprinyo Oliva

[11] 4,153,494

[45] * May 8, 1979

[54] PROCESS FOR OBTAINING BRIGHTLY METALLIZED SURFACES

[76] Inventor: Enrique Vilaprinyo Oliva, Ronda del General Mitre, No. 64, Barcelona, Spain

[ * ] Notice: The portion of the term of this patent subsequent to Feb. 8, 1994, has been disclaimed.

[21] Appl. No.: 640,392

[22] Filed: Dec. 12, 1975

[51] Int. Cl.[2] .......................... B44C 1/10; B32B 31/12; B32B 15/02

[52] U.S. Cl. .................................... 156/230; 156/233; 156/234; 156/241; 427/147

[58] Field of Search ............... 156/230, 233, 234, 241; 427/147

[56] References Cited

U.S. PATENT DOCUMENTS

| | | | |
|---|---|---|---|
| 1,124,869 | 1/1915 | Davis et al. | 156/234 X |
| 2,969,300 | 1/1961 | Franz | 156/233 |
| 3,458,376 | 7/1969 | Malik | 156/233 |
| 3,589,962 | 6/1971 | Bonjour | 156/233 |
| 3,660,190 | 5/1972 | Stroszynski | 156/233 X |
| 3,753,850 | 8/1973 | Brunet | 156/233 X |
| 3,910,806 | 10/1975 | Schwartz | 156/233 |

*Primary Examiner*—James R. Hoffman
*Attorney, Agent, or Firm*—Holman & Stern

[57] ABSTRACT

A process for obtaining a shiny metallized surface on a plated or laminated material by either coating the surface with a varnish, and then applying a plastic film which has been covered with a metallizing agent until the varnish absorbs the agent and sets; or applying a plastic film which has been precovered with metallizing agent and precoated with a varnish to a surface until the varnish sets. The film acts as both a carrier and a glossing element.

6 Claims, No Drawings

PROCESS FOR OBTAINING BRIGHTLY METALLIZED SURFACES

BACKGROUND OF THE INVENTION

This invention consists of a process for obtaining brightly metallized surfaces of any plated or laminated material, be it flexible, rigid, or semi-rigid, such as paper, cardboard, pasteboard, photographic or plastic film and wood. By this process, one can obtain surfaces which are, or look brightly metallized without altering or damaging the material used. The process provides for a uniform metallization with a surface quality superior to that obtained with processes known until now. All kinds of uses can be made of the surfaces obtained such as offset printing, (FLEXO, HUECO, SERIGRAFIA—probably other printing processes) type-setting, etc. The practical and economic advantages of this process will be discussed in this description.

At the present, several processes exist for metallizing plated or laminated materials. One of the known processes consists in plating or applying a thin metallized coat to the material to be metallized. Aluminum is generally used the minimum thickness of which is seven microns. The two materials are joined using adhesive or cement. This process is known as laminating or gluing.

Another traditional process consists in the condensation of aluminum vapor on the surface to be coated or metallized. This surface is first prepared with a varnish or another binding material in order to assure adhesion of the metallic vapor. In certain cases the varnish or other material is not necessary. The vaporization of aluminum is done in special high vacuum rooms with an electric arc. This process is known as high vacuum metallization.

The aforementioned traditional processes have their disadvantages. With the first process, lamination, which is the most common, a prefabricated metallic sheet is joined by means of adhesive to the desired surface as has been explained. There are no limiting factors with regard to the type of support as long as its surface is satisfactory for gluing. The disadvantage is an economic one in that the price of metallic sheets is high.

The second or "high vacuum" process has the disadvantage of requiring support surfaces allowing for easy degasification, and in particular, the total elimination of humidity. Thus, the evenness, and fineness of the surface and its lustre are limited by those of the support itself. With a plastic support, the high vacuum metallization results in a brilliant finish, whereas with other materials, such as cardboard, fabrics, etc., the metallized finish is dull.

DETAILED DESCRIPTION OF THE INVENTION

This invented process is one for metallizing plated or laminated supporting surfaces so that the finish is equally fine, smooth and shiny regardless of the materials used. This is due to a simultaneous metallization and mackling of the surface of the support to be metallized.

This process for obtaining metallized surfaces with whatever type of plated or laminated support consists essentially in the transmittal of the metallizing agent to the surface of the support to be metallized at the same time that the surface is especially prepared so that the surface and the metallizing agent adhere strongly. To this end, for carrying and transmitting the metallic powder or other agent, the same element is used as for applying varnish or adhesive to solidify the metallizing agent on the support surface. The transmittal of the metallizing agent from the macula element which takes it to the varnished surface and the joining obtained is accomplished by simple lamination or cold gluing in the surrounding temperature. The time necessary is specified for the drying or hardening of the adhesive or varnish which secures permanently the metallizing agent to the treated surface.

This invention, which uses the gluing element as both the carrier and the transmitter of the metallizing agent, has most favorable results using a plastic film such as polypropylene, polyethylene, polyester, cellulose acetate, polyvinylchloride, polyvinylidenechloride, regenerated cellulose and similar materials. The nature of the plastic film used depends on the varnish, cement, or adhesive used to attach the metallizing agent to the support surface so that at the end of the drying or hardening process the plastic film can be easily separated from the support. The metallizing agent carried by the plastic film will have a covering of metallic dust sufficiently dispersed so that the covering will not adhere to the film.

In accordance with the invention, the support surface to be metallized will be covered with a fine film of adhesive or varnish of one, two, or more components, serving as layers for drying, hardening, or reticulation when the loss of the dissolvents occurs.

In accordance with the invention, the film or plastic used to carry and transfer the metallizing agent is placed with its carrying face against the varnished surface of the support and is maintained in that position long enough for drying and hardening of the varnish. During this process the coat of metallic dust carried on the plastic film is absorbed by the varnish thereby joining it to the support surface. The film is left in this position a sufficiently long time for the varnish to dry and harden, and then the film can be easily removed. The surface is thus metallized and shining, and the film which is totally clean, can be used again to repeat the process.

In accordance with another embodiment of the invention, the varnish of one, two, or more components can be applied to the face of the plastic film upon which the coat of metallic dust or metallizing agent has been deposited so that when the support surface is laminated to the varnished face of the film, the varnish and metallizing agent are transferred from the film to the support surface. The film, which has served to laminate the two surfaces while the bond dries and hardens, is thus left clean.

The adhesive or varnish used can be any conventional ones with dissolvents or hardeners which provide for easy drying preferably, and thus create less tension in paper and cardboard.

Using the process created by this invention, the paper, cardboard, or other support undergoes no change whatsoever in its nature. The material simply acquires a uniformly metallized surface, totally smooth, neat, and shiny. The uniformity of the surface finish is provided by the adhesive or varnish which covers that surface. The fineness and shininess is provided by the plastic film which serves as a macula while the varnish or adhesive is drying. All of these factors are independent from the porousness of the rugosity of the support.

This metallizing process represents substantial improvements, both economical and practical, over those processes previously used. This is because the metallic coat applied to the support surface can be less than one micron, whereas the minimum metallic lamination used in the gluing process is seven microns. On rough materials a perfectly smooth and uniform surface can be obtained. There are no degasification problems, and the humidity does not have to be removed from the material to be treated.

Another special characteristic of the newly invented process lies in the possibility of metallizing just selected parts of the surface, making interesting combinations, etc. To this end, varnish is applied to the support surface in portions, zones, or lines so that when the lamination and transfer of the metallizing agent take place, only those surface parts or lines covered with varnish or adhesive will be metallized. Thus, there are advantages with regard to decorating, printing, and packing over those afforded by the other metallizing processes.

This invention thus affords possibilities for all kinds of variations without changing the essence of the process.

What I claim is:

1. A process for obtaining a shiny metallized surface consisting essentially of:

coating a surface with a fine coat of varnish, covering one side of a plastic film with a metallizing agent of metallic powder in a layer of less than 1 micron in thickness;

laminating said surface and said one side of a plastic film before said varnish is set so that said metallizing agent is absorbed into said varnish;

leaving said film in contact with said surface until said varnish is set, whereupon said film acts as a glossing element;

and removing said film from said surface.

2. A process for obtaining a shiny metallized surface comprising covering one side of a plastic film with a metallizing agent of a metal powder in a layer of less than 1 micron in thickness;

coating said side with a fine coat of varnish;

laminating said side of said film and a surface before said varnish has set whereupon said varnish and said metallizing agent are transferred to said surface;

leaving said film in contact with said surface until said varnish sets, whereupon said film acts as a glossing element; and removing said film from said surface.

3. The process according to claim 1, wherein said varnish is coated in a particular design not covering the entire surface.

4. The process according to claim 2, wherein said varnish is coated in a particular design not covering the entire surface.

5. The process according to claim 1 wherein said plastic film is made from a material selected from the group consisting of polypropylene, polyethylene, polyester, cellulose acetate, polyvinylchloride, polyvinylidenechloride, and regenerated cellulose.

6. The process according to claim 2 wherein said plastic film is made from a material selected from the group consisting of polyproplylene, polyethylene, polyester, cellulose acetate, polyvinylchloride, polyvinylidenechloride, and regenerated cellulose.

* * * * *